US008346902B2

(12) United States Patent
Bavaria et al.

(10) Patent No.: US 8,346,902 B2
(45) Date of Patent: Jan. 1, 2013

(54) PERFORMING DEVICE CONFIGURATION REDISCOVERY

(75) Inventors: Priti Bavaria, Austin, TX (US); Stephan Otis Broyles, Austin, TX (US); Glenn Eric Rinkenberger, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2274 days.

(21) Appl. No.: 10/631,056

(22) Filed: Jul. 31, 2003

(65) Prior Publication Data

US 2005/0027832 A1 Feb. 3, 2005

(51) Int. Cl.
*G06F 15/177* (2006.01)
(52) U.S. Cl. .................. 709/222; 709/220; 709/221
(58) Field of Classification Search .................. 709/201, 709/220–223
See application file for complete search history.

(56) References Cited

U.S. PATENT DOCUMENTS

| 5,854,905 | A  | * | 12/1998 | Garney .......................... 710/104 |
| 6,591,320 | B1 | * | 7/2003  | Cheston et al. ................ 710/104 |
| 6,779,004 | B1 | * | 8/2004  | Zintel ............................ 709/227 |
| 6,785,720 | B1 | * | 8/2004  | Seong ........................... 709/220 |
| 6,847,993 | B1 | * | 1/2005  | Novaes et al. ................ 709/221 |
| 7,024,547 | B2 | * | 4/2006  | Kartoz ............................... 713/1 |
| 2002/0029256 | A1 |  | 3/2002  | Zintel et al. .................... 709/218 |
| 2002/0174209 | A1 |  | 11/2002 | Sesek et al. .................... 709/223 |
| 2002/0184300 | A1 |  | 12/2002 | Schmeling et al. ........... 709/202 |
| 2003/0074428 | A1 |  | 4/2003  | Haines .......................... 709/220 |
| 2004/0107329 | A1 | * | 6/2004  | Krejsa ........................... 711/173 |

FOREIGN PATENT DOCUMENTS

GB 2361156 A 10/2001

OTHER PUBLICATIONS

Nidd, "Timeliness of Service Discovery in DEAPspace", Proceedings 2000, International Worksh p on Parallel Processing, pp. 73-80, Published Los Alamitos, CA, 2000.
Ramachandran et al., "Clustering Algorithms for Wireless Ad Hoc Networks", IEEE Online Library/ACM Digital Library, 2000, pp. 54-63.
Dabrowski et al., "Understanding Consistency Maintenance in Service Discovery Architectures during Communication Failure", 2002 ACM Digital Library, pp. 168-178.
Dabrowski et al, "Understanding Self-Healing in Service-Discovery Systems", 2002, ACM Digital Library, pp. 15-20.
Hermann et al., "DEAPspace—Transient Ad-Hoc Networking of Pervasive Devices", 2000 IEEE Online Library, pp. 133-134.
Storey et al., "Resource Configuration in Ad Hoc Networks The MARE Approach", 2000 IEEE Online Library, pp. 60-69.
Richard, III, "Service Advertisement and Discovery: Enabling Universal Device Cooperation", IEEE Internet Computing, Sep./Oct. 2000 IEEE, pp. 18-26.
Nidd et al., "Service Discovery in DEAPspace", IEEE Personal Communications, Aug. 2001, pp. 39-45.

* cited by examiner

*Primary Examiner* — Mohamed Ibrahim
(74) *Attorney, Agent, or Firm* — Yee & Associates, P.C.

(57) ABSTRACT

A method, apparatus and computer instructions in a data processing system for identifying device configurations. Unique identification information is identified for a set of devices in the data processing system. The identified unique identification information is compared with previously identified unique identification information. Configuration data is moved to a memory for devices in the set of devices in which a match exists between the identified unique identification information and the previously identified unique identification information for devices. Configuration information is obtained from a device in which configuration information is absent in the memory after configuration data has been moved to the memory for the devices to form a current set of configuration data for the set of devices.

12 Claims, 5 Drawing Sheets

PERFORMING DEVICE CONFIGURATION REDISCOVERY

BACKGROUND OF THE INVENTION

1. Technical Field

The present invention relates generally to an improved data processing system and in particular, a method and apparatus for processing data. Still more particularly, the present invention provides a method, apparatus, and computer instructions for performing device configuration rediscovery.

2. Description of Related Art

In powering on a computer and performing a boot or initial program load (IPL) to an operating system, all of the devices in the computer are identified and initialized as part of this process. These devices may include, for example processor, memory DIMM and IO bridge. These devices contain configuration information or data that is used in identifying and initializing the devices. This device configuration data may include, for example, part numbers, manufacturing codes, revision levels, firmware software levels, and other device specific information. This information is often stored into low cost memories, such as an electrically erasable programmable read-only memory (EEPROM), attached to low cost bus interfaces such as I2C or serial buses accessible via a universal asynchronous receiver transmitter (UART).

The data rates of these low cost interfaces are relatively slow. This situation results in slow read times while accessing a device. Therefore, it takes a long time to read the memory of the entire device. Additionally, since the low cost bus interfaces are simple in nature (I2C bus has 2 signals, clock and data), these interfaces do not handle error correction strategies. The data must be read from the device into the application layer program before an error in the data can be detected. If an error occurs, then that entire data block must be reread into the memory. This recovery process also adds time to getting a good image of the data read from the devices and stored in memory. In larger servers that contain large numbers of resources, minutes may be required to discover all of the devices in the system.

In servers, an embedded microcomputer (service processor) is powered on before the main system processors are booted. This embedded microcomputer is responsible for gathering the configuration data from the devices installed in the computer and assembling that data into a format that can be understood by the main operating system.

In some systems, a discovery process is used to find all devices in the computer. The device configuration data stored on any one device is used to identify what devices can be connected to that device. In computer systems such as these, it is impossible to determine what devices are actually installed in the computer without starting at the first configuration device, processing the device to determine what can be connected to it, reading the configuration data from those devices and continuing processing in this manner until all devices have been found.

Another problem is that operators can remove or install devices into the main system while the computer is in a powered-off state. Therefore, all the devices must have some portion of their configuration data read during the IPL of the main system in order to determine whether a device has been removed from the system, a new device installed in its place, or a new device added to the system where one did not exist before.

Therefore, it would be advantageous to have an improved method, apparatus, and computer instructions for obtaining configuration data on devices.

SUMMARY OF THE INVENTION

The present invention provides a method, apparatus and computer instructions in a data processing system for identifying device configurations. Unique identification information is identified for a set of devices in the data processing system. The identified unique identification information is compared with previously identified unique identification information. Configuration data is moved to a memory for devices in the set of devices in which a match exists between the identified unique identification information and the previously identified unique identification information for devices. Configuration information is obtained from a device in which configuration information is absent in the memory after configuration data has been moved to the memory for the devices to form a current set of configuration data for the set of devices.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
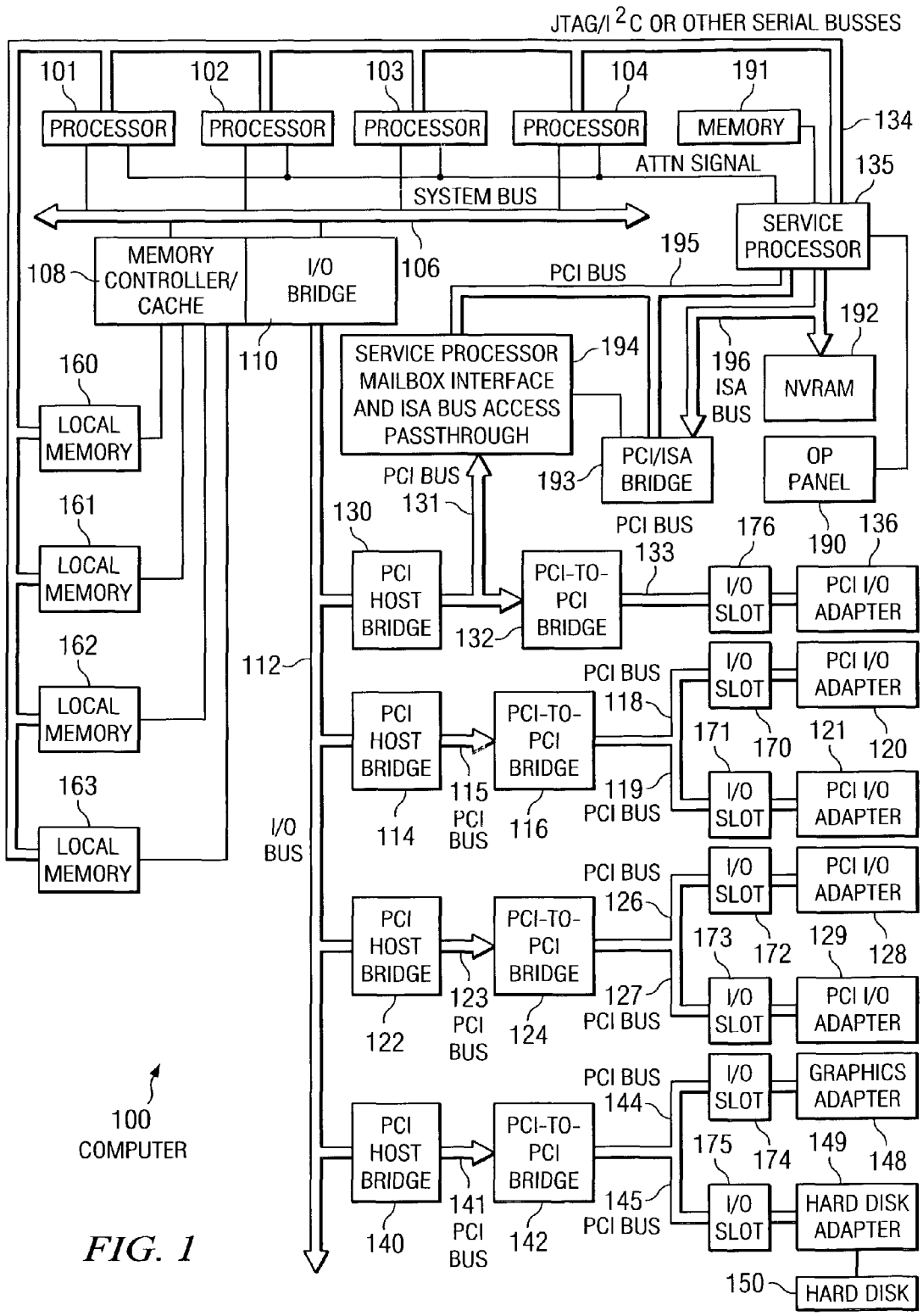
FIG. 1 is a block diagram of a data processing system in which the present invention may be implemented.

With reference now to the figures, and in particular with reference to FIG. 1, a block diagram of a data processing system in which the present invention may be implemented is depicted. Computer 100 is a data processing system, which may take the form of a symmetric multiprocessor (SMP) system. As illustrated, computer 100 includes a plurality of processors 101, 102, 103, and 104 connected to system bus 106. For example, computer 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Computer 100 is a logical partitioned (LPAR) data processing system. Thus, computer 100 may have multiple heterogeneous operating systems (or multiple instances of a single operating system) running simultaneously. Each of these multiple operating systems may have any number of software programs executing within it. Computer 100 is logically partitioned such that different PCI I/O adapters 120-121, 128-129, and 136, graphics adapter 148 and hard disk adapter 149 may be assigned to different logical partitions. In this case, graphics adapter 148 provides a connection for a display device (not shown), while hard disk adapter 149 provides a connection to control hard disk 150.

Thus, for example, suppose computer 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within computer 100 is assigned to a different logical partition. Thus, each operating system executing within computer 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows XP operating system may be operating within logical partition P3. Windows XP is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between computer 100 and input/output devices such as, for example, other network computers, which are clients to computer 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, computer 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 and memories 160-163 via a plurality of JTAG/I$^2$C/Serial busses 134. JTAG/I$^2$C/Serial busses 134 are a combination of JTAG/scan busses (see IEEE 1149.1) Phillips I$^2$C busses and/or serial busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When computer 100 is initially powered up, service processor 135 uses the JTAG/I$^2$C/serial busses 134 to interrogate the system (host) processors 101-104, memory controller/cache 108, and I/O bridge 110. At completion of this step, service processor 135 has an inventory and topology understanding of computer 100. These two steps occur in discovery or pre-discovery. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then computer 100 is allowed to proceed to load executable code into local (host) memories 160-163. Service processor 135 then releases host processors 101-104 for execution of the code loaded into local memory 160-163. While host processors 101-104 are executing code from respective operating systems within computer 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in computer 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Computer 100 may be implemented using various commercially available computer systems. For example, computer 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

The present invention provides a method, apparatus, and computer instructions for performing device configuration rediscovery for devices in a data processing system such as computer 100.

While the main system is powered off but the embedded microcomputer is powered on, the configuration data is pre-read and processed into the embedded computer's memory to store an image of the data read from each device into a buffer or file. In this example, the embedded microcomputer is a service processor such as service processor 135. The embedded microcomputer includes service processor 135, OP panel 190, memory 191, NVRAM 192, PCI/ISA Bridge 193, Service Processor mailbox interface and ISA Bus Access passthrough 194, PCI Bus 195, and ISA bus 196. The other components form the main system, which processors 101-104, as well as other devices connected to those processors by a bus system.

At the end of the discovery process, a complete set of buffers or files exists in the random access memory (RAM) that contains the data read from each device currently installed in the computer. In these examples, the set of buffers or files are placed in NVRAM 192 or memory 191. NVRAM 192 is used to allow the data to survive power cycles to service processor 135.

Additionally, an index table is generated that identifies every device discovered in the computer. In these examples it is possible that not all devices in the "main system" will always be identified by this process. Other techniques maybe used such as PCI bus scans which could identify the cards residing on a PCI bus. For example, this table may identify for each device a bus address and offsets at which a unique device identification such as, for example, a serial or part number, is located.

When the IPL process begins, the embedded microcomputer traverses the index table, reading the unique identification data of the device from the physical low cost device and compares the unique identification data against the bytes that were previously read to the memory. If they match, then the buffer contains the complete image of that device. This image in the buffer is moved to a temporary location such as an area or buffer in a RAM. If they do not match, then the device's image is erased from the memory.

Once all entries in the index table are processed, the result is a set of data in the temporary RAM location that represents a subset of the devices actually. installed in the computer. If no hardware has been changed, added, or removed, this set of data contains the entire set of devices. The original destination buffers are now empty.

At that point, a new discovery process is initiated, however, instead of reading the data directly from the devices, the discovery process first checks the temporary RAM location to see if the image for the device it is about to read exists. The process described above is an example of the rediscovery process. If the image does exist, the data representing the image is moved from the temporary location back to the final assembled data area and the data is normally processed. If the data for a device does not exist in the temporary RAM location, then that data is read from the device and processed normally using present discovery processes.

The result is that the amount of data that needs to be read from the hardware devices is reduced. This mechanism of the present invention decreases the time needed to perform the discovery process while the main system is booting. An additional advantage of the mechanism of the present invention is that this mechanism simplifies the initial pre-discovery process and the discovery process so that the same process can be used for both cases reducing the firmware size.

Figure 2:
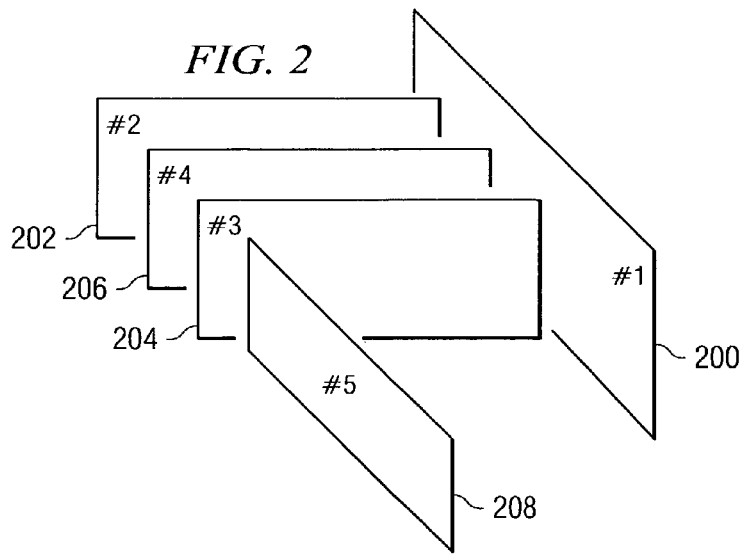
FIG. 2 is a diagram illustrating devices in accordance with a preferred embodiment of the present invention.

Turning next to FIG. 2, a diagram illustrating devices is depicted in accordance with a preferred embodiment of the present invention. In this example, devices 200, 202, 204, 206, and 208 are present in a computer system, such as computer 100 in FIG. 1. FIG. 2 is an example illustration of devices on boards which are interconnected.

Figure 3:
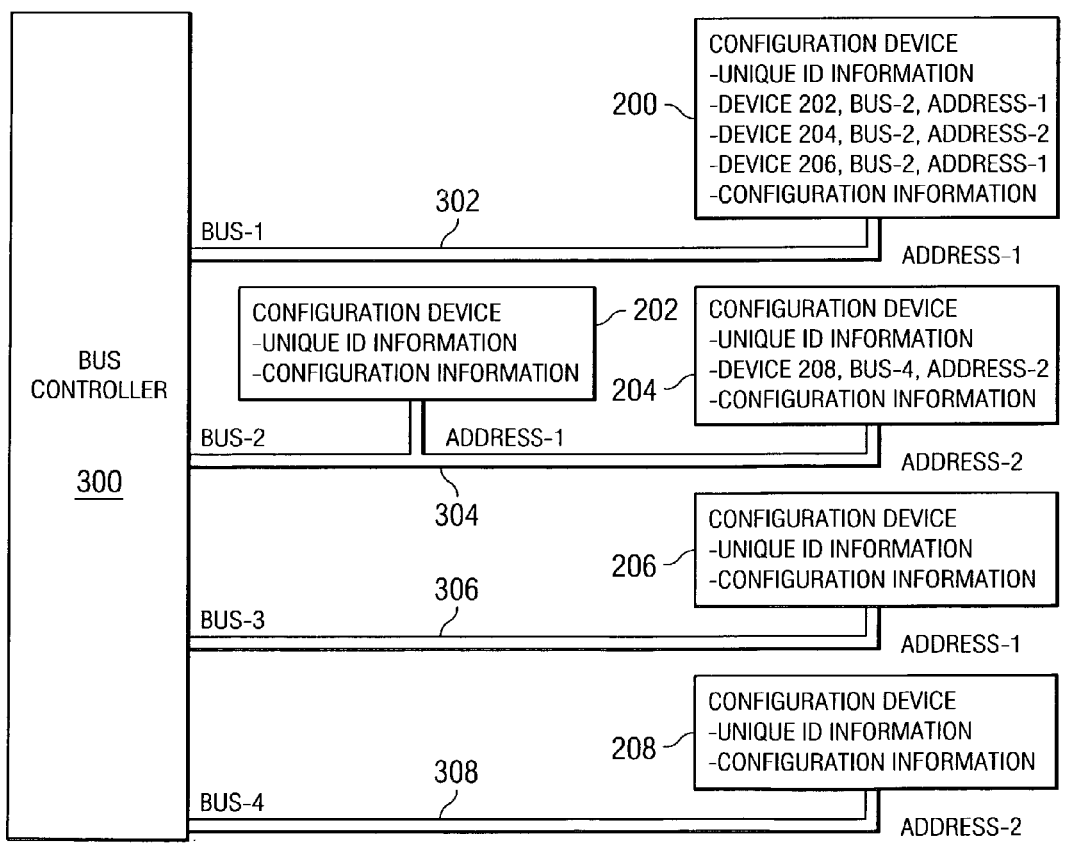
FIG. 3 is a block diagram illustrating devices in a computer in accordance with a preferred embodiment of the present invention.

Turning now to FIG. 3, a block diagram illustrating devices in a computer is depicted in accordance with a preferred embodiment of the present invention. In this example, devices 200, 204, 206, and 208 are connected to bus controller 300 by buses 302, 304, 306, and 308 respectively.

Device 200 is connected to bus controller 300 by bus 302. Device 202 and device 204 are connected to bus controller 300 by bus 304. Device 206 is connected to bus controller 300 by bus 306. Device 208 is connected to bus controller 300 by bus 308. These devices contain configuration data and are located at a particular address.

Device 200 includes an identification of a bus and addresses for devices 202, 204, and 206 in addition to unique identifier information and other configuration data. Device 204 includes an identification of a bus and address for device 208 in addition to unique identifier information and other configuration data. The other devices only contain a unique identifier and configuration data in these examples.

Figure 4:
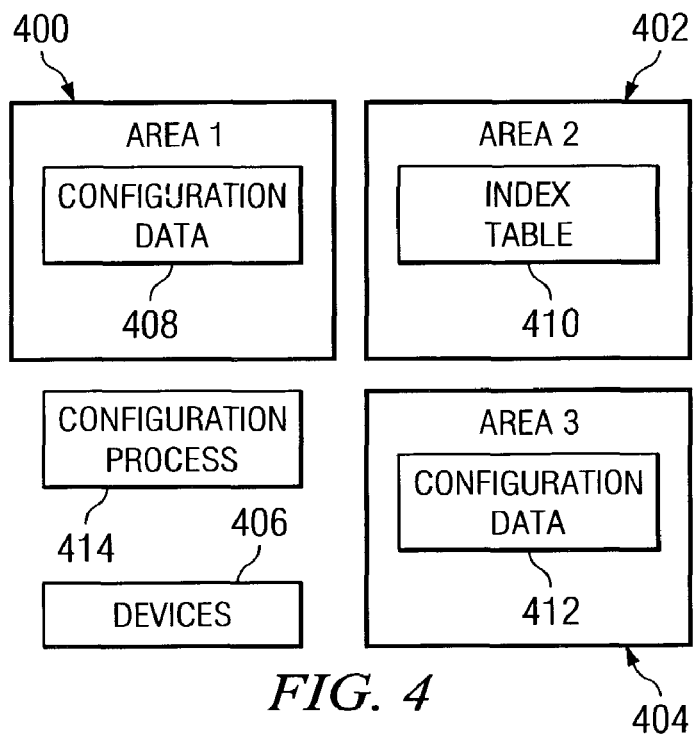
FIG. 4 is a diagram illustrating components used in discovering configuration data in accordance with a preferred embodiment of the present invention.

Turning next to FIG. 4, a diagram illustrating components used in discovering configuration data is depicted in accordance with a preferred embodiment of the present invention. In this example, area 1 400, area 2 402, and area 3 404 are configured for use in discovering and managing configuration data from devices 406, may be, for example, the devices illustrated in FIGS. 2 and 3. Each of these areas may be implemented as a buffer in a memory, such as a RAM. In these examples, memory 191 may be used for the areas.

Area 1 400 contains configuration data 408, which is formatted such that the main system's operating system can identify this portion of memory as containing a copy of configuration data for each device. Area 2 402 contains index table 410. Index table 410 includes information for each of the devices.

In these examples, this information includes an index to locate configuration data associated with a device stored in area 1 400. Also, information also required to address the device is included in this table. Additionally, index table 410 includes an offset to a memory location within the device at which the unique identifier information is stored. Further, either a copy of the unique identification information or an offset to this information in area 1 400 is included for the device. Area 3 404 is a temporary storage area used to store a subset of the devices while a rediscovery process is performed. This process is part of configuration process 414, which may be executed by an embedded processor, such as service processor 135 in FIG. 1. After the rediscovery process has been performed, the information in area 3 404 is removed or discarded.

Before the main system is powered on, configuration process 414 pre-collects configuration data from devices 406 and stores this data in area 1 400 and generates index table 410 in area 2 402. After the main system is powered on, configuration process 414 identifies a device in index table 410. For this device, unique identifier information is read from index table 410. This information may be present in index table 410 or an offset to this information in configuration data 408 may be present in index table 410.

Then, the unique identification information is read from the device. These unique identifiers are compared with each other. If a match is present, the device is assumed to not have been moved. In this case, the configuration data for that device in configuration data 408 in area 1 400 is moved to area 3 404 and placed in configuration process 414.

On the other hand, if the unique identifier information does not match, then it is assumed that the device has been removed or a new device has been inserted at this address since the original discovery process has occurred. The data corresponding to that device in configuration data 408 is deleted.

Once all of the devices in index table 410 have been processed, configuration data 412 in area 3 404 contains a subset of the devices. At this time, area 1 400 is empty. Index table 410 is then removed from area 2 402. Then, a discovery process for reading data for devices is performed. Each time data is read from a device, a check is made to see if the data exists in configuration process 414. If this information is present in configuration data 412, the information is processed and stored into area 1 400. Additionally, a newly generated index table in area 2 402 is updated. Such a process is fast because information is read from a high-speed memory, such as a RAM. If the data is absent in configuration process 414, the data is read directly from the device. This data is then processed and placed into configuration data 408 in area 1 400. The new index table in area 2 402 is updated. This process is repeated until all the information for all of the devices has been discovered.

Figure 5:
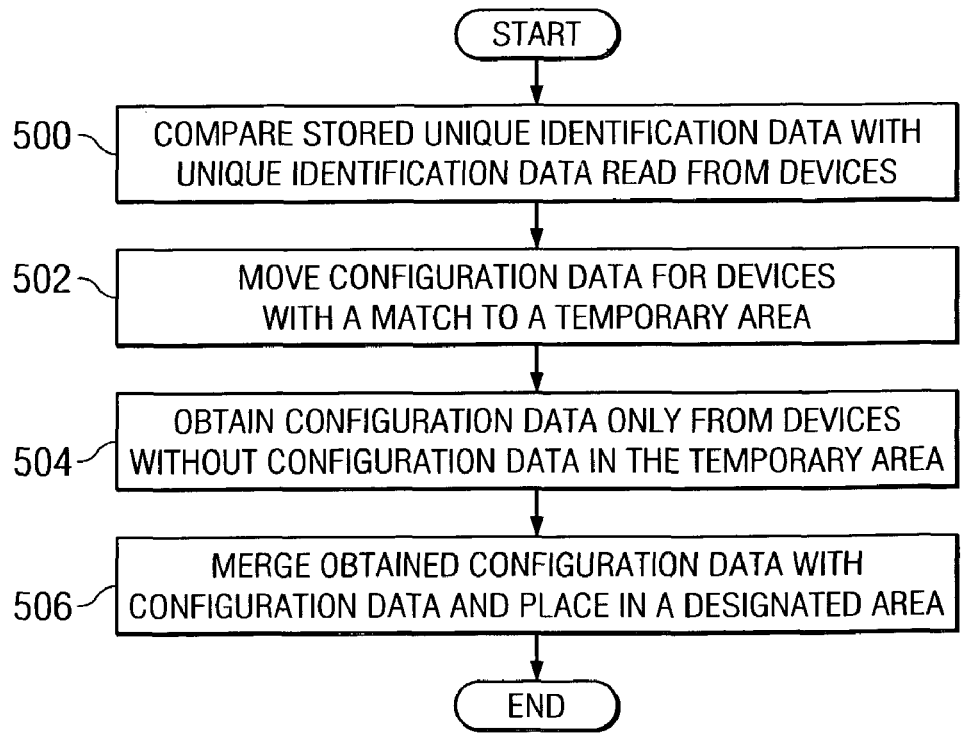
FIG. 5 is a flowchart of a process for discovering configuration data in accordance with a preferred embodiment of the present invention.

Turning next to FIG. 5, a flowchart of a process for discovering configuration data is depicted in accordance with a preferred embodiment of the present invention. The process illustrated in FIG. 5 is a high-level flowchart of a process that may be implemented in a processor, such as service processor 135 in FIG. 1.

The process begins by comparing stored unique identification data with unique identification data read from the devices (step 500). Configuration data for devices with a match are moved to a temporary area in a memory (step 502). Configuration data is obtained only from devices without configuration data in the temporary area (step 504). Thereafter, the obtained configuration data is merged with the configuration data and placed into a designated area for use (step 506) with the process terminating thereafter.

Figure 6A:
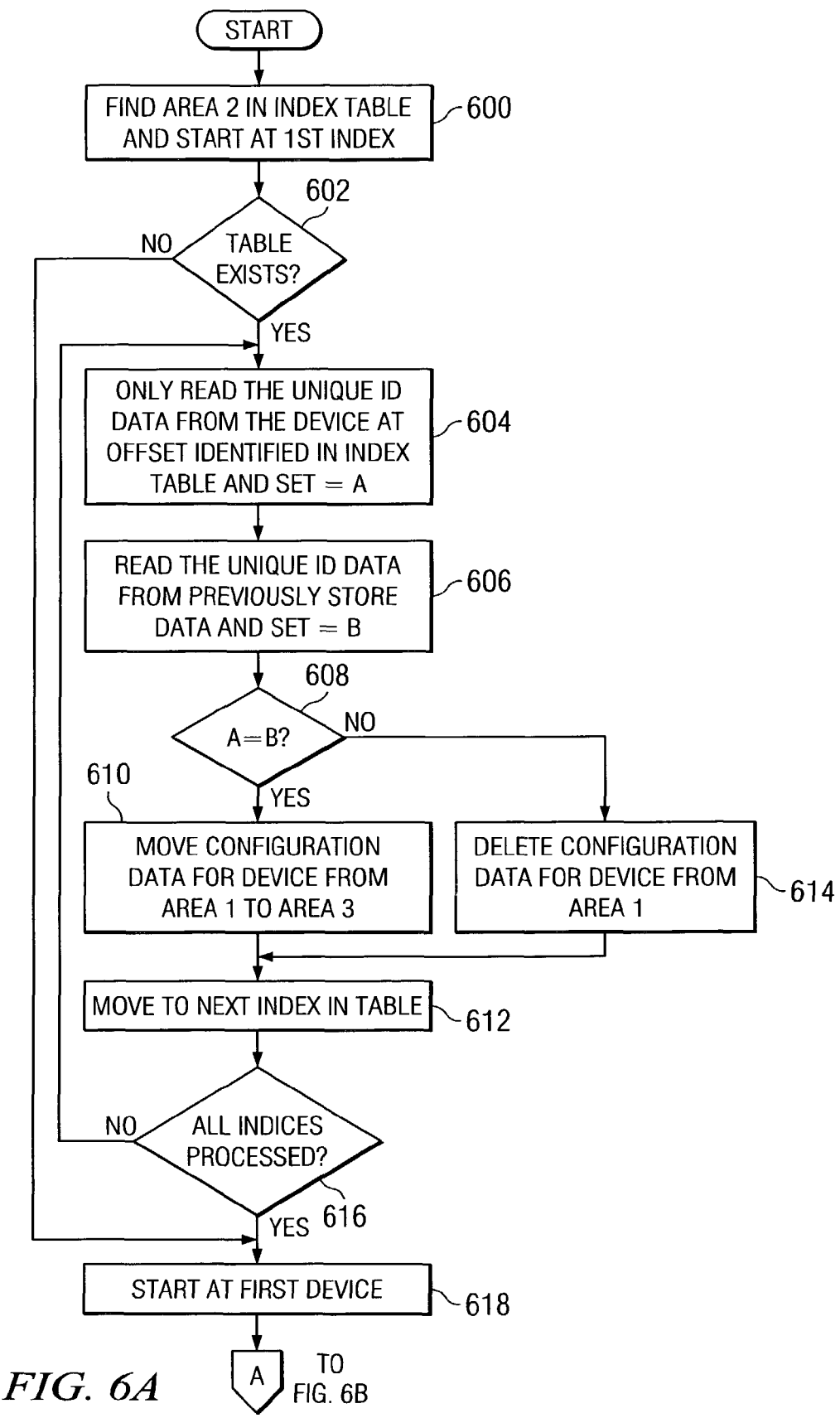
FIG. 6 is a flowchart of a process for obtaining configuration data of devices in accordance with a preferred embodiment of the present invention.
Figure 6B:
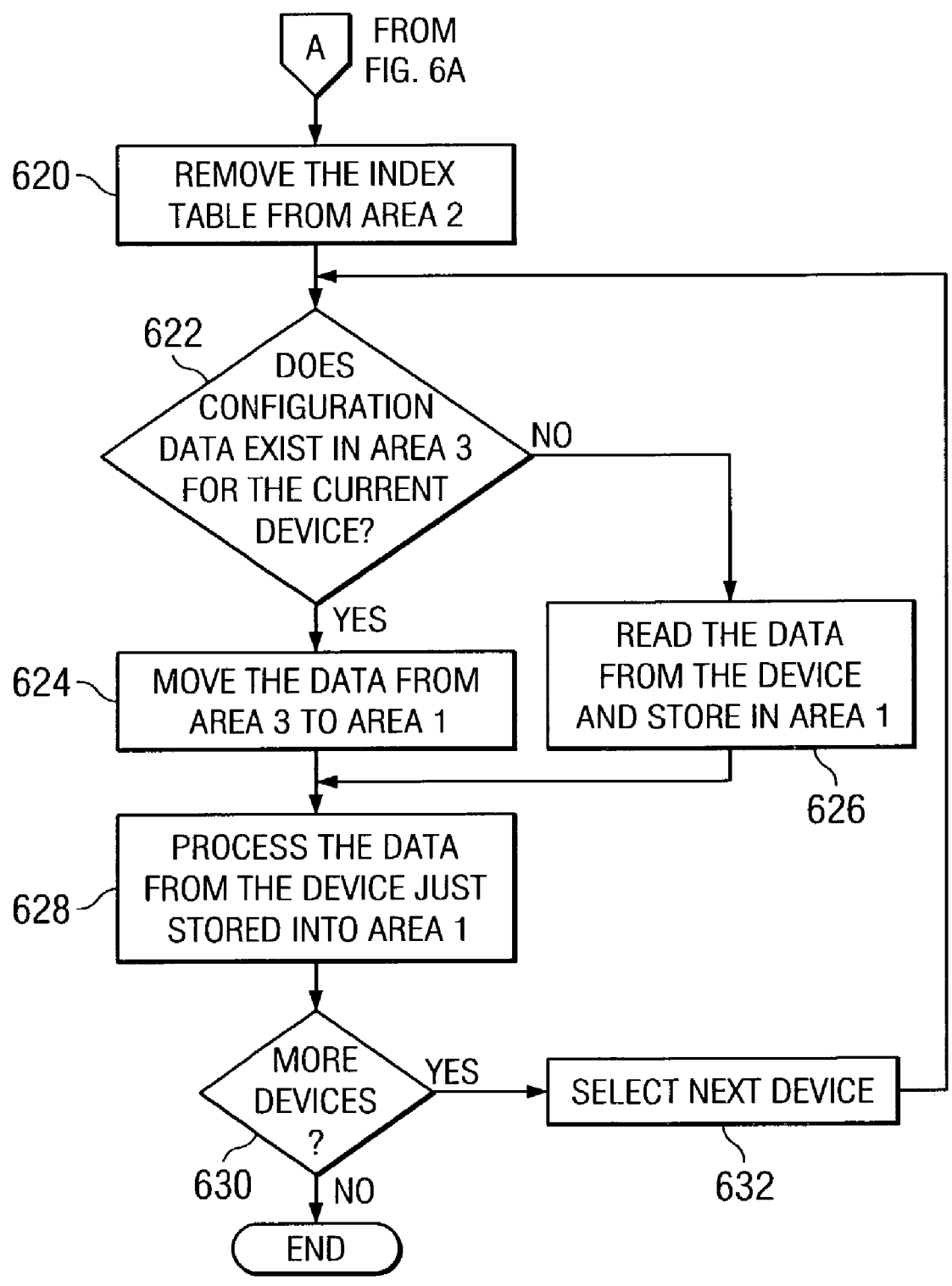

Turning next to FIG. 6, a flowchart of a process for obtaining configuration data of devices is depicted in accordance with a preferred embodiment of the present invention. The process illustrated in FIG. 6 may be implemented in a processor, such as service processed 135 in FIG. 1.

The process begins by finding an index table in area 2 and starting at the first index (step 600). Area 2 corresponds to area 2 402 in FIG. 4 in this example. A determination is then made as to whether and index table exists (step 602). If the index table exists, only the unique identifier data from the device for this index is read at the offset identified in the index table with this identifier being set equal to A (step 604). Next, the unique identification data is read from the previously stored data and set equal to B (step 606). A determination is made as to whether A is equal to B (step 608).

If A is equal to B, then configuration data for this device is moved from area 1 to area 3. Area 1 corresponds to area 1 400 and area 3 corresponds to area 3 404 in FIG. 4. The process then identifies the next index in the table (step 612). With reference again to step 608, if A is not equal to B, the configuration data for the device is deleted from area 1 (step 614), with the process then proceeding to step 612 as previously described.

A determination is made as to whether all the indices have been processed (step 616). If all the indices have not been processed, the process returns to step 604 as described above.

Otherwise, the process starts at the first devices (step 618). The index table is removed from area 2 (step 620). Then, a determination is made as to whether configuration data exists in area 3 for the current device (step 622). If information exists in area 3, the process then moves this data from area 3 to area 1 (step 624). Otherwise, the data is read from the device and stored in area 1 (step 626). In either case, the data for the device stored in area 1 is processed (step 628).

A determination is made as to whether more unprocessed devices are present (step 630). If more unprocessed devices are present, the next device is selected for processing (step 632) with the process then returning to step 622 as described above.

Turning back to step 602, if an index table does not exist in area 2, the process then proceeds to step 618 as described above. In this manner, configuration data for devices can be obtained and processed in a quick and efficient manner because configuration data for devices that have not been changed or moved can be obtained from a memory rather than having to obtain the data directly from the devices themselves.

As illustrated in FIG. 6, the path following steps 600, 602, 618, 620 and the subsequent steps are those for a prediscovery or discovery process. The path following steps 600, 602, 604, 606, and subsequent steps are for a rediscovery process. Prediscovery may be referred to as an initial discovery process, which runs before the main system is powered on. The rediscovery process is steps that occur after the discovery process completes.

Thus, the present invention relates generally to an improved data processing system and in particular, a method and apparatus for processing data. Still more particularly, the present invention provides a method, apparatus, and computer instructions for discovering configuration data from devices in a data processing system, such as computer 100 in FIG. 1. The mechanism of the present invention avoids obtaining configuration data from devices that have not changed. Previously obtained information is used. Configuration data is obtained directly only from those devices that were not previously present or those devices that have been moved. In this manner, data is read from high-speed devices such as a RAM for most of the devices. Further, using this process for pre-discovery of devices and rediscovery of devices can implemented such that both processes are identical in nature, reducing firmware size.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for identifying device configurations, the method comprising:
   identifying unique identification information for a set of devices in the data processing system to form identified unique identification information;
   comparing the identified unique identification information with previously identified unique identification information;
   moving configuration data to a memory for devices in the set of devices in which a match exists between the identified unique identification information and the previously identified unique identification information for devices; and
   obtaining configuration information from a device in which configuration information is absent in the memory after configuration data has been moved to the memory for the devices to form a current set of configuration data for the set of devices, wherein the previously identified unique identification information is accessed using a table associated with the configuration data for the set of devices, wherein the table comprises (i) an index used to locate particular configuration data for a particular device, (ii) information used to address the particular device, and (iii) an offset to a memory location within the particular device at which particular unique identifier information for the particular device is stored.

2. The method of claim 1, wherein one device of the set of devices contains, in addition to unique identifier information for the one device, identifying information for locating another device of the set of devices within the data processing system.

3. The method of claim 2, wherein the data processing system comprises a plurality of different busses, and wherein the identifying information comprises a bus identifier and an address identifier of where the another device is accessible in the data processing system.

4. The method of claim 1, wherein the memory is a volatile memory, and wherein the configuration data is moved from a non-volatile memory to the volatile memory.

5. The method of claim 4, wherein the current set of configuration data is moved to the non-volatile memory from the volatile memory after being obtained.

6. The method of claim 1, wherein the identifying step is performed by an embedded processor of the data processing system while a plurality of primary processors of the data processing system are powered-off.

7. The method of claim 6, wherein the obtaining step is initiated by the embedded processor during an initial program load (IPL) of the data processing system.

8. The method of claim 1, wherein the memory is a temporary random access memory comprising an area for maintaining the previously identified unique identification information and another area for maintaining the moved configuration data while the obtaining configuration information is being performed.

9. The method of claim 1, wherein the unique identification information is a unique device identifier.

10. The method of claim 1, wherein the current configuration data for the set of devices is stored in a set of files.

11. The method of claim 1, wherein the unique identification information is identified by reading the unique identification information from the set of devices.

12. The method of claim 1, wherein the data processing system comprises a plurality of different busses, and wherein the information used to address the particular device comprises a bus identifier that identifies which bus of the plurality of different busses that the particular device is attached to.

* * * * *